United States Patent
Misra et al.

(10) Patent No.: US 10,002,188 B2
(45) Date of Patent: Jun. 19, 2018

(54) AUTOMATIC PRIORITIZATION OF NATURAL LANGUAGE TEXT INFORMATION

(71) Applicant: Accenture Global Services Limited, Dublin (IE)

(72) Inventors: Janardan Misra, Pithoragarh (IN); Shubhashis Sengupta, Bangalore (IN); Subhabrata Das, Kolkata (IN)

(73) Assignee: Accenture Global Services Limited, Dublin (IE)

( * ) Notice: Subject to any disclaimer, the term of this patent is extended or adjusted under 35 U.S.C. 154(b) by 752 days.

(21) Appl. No.: 14/495,239

(22) Filed: Sep. 24, 2014

(65) Prior Publication Data
US 2015/0088910 A1    Mar. 26, 2015

(30) Foreign Application Priority Data

Sep. 25, 2013 (IN) ............................ 4333/CHE/2013

(51) Int. Cl.
| | |
|---|---|
| *G06F 7/00* | (2006.01) |
| *G06F 17/30* | (2006.01) |
| *G06F 17/22* | (2006.01) |
| *G06F 17/27* | (2006.01) |

(52) U.S. Cl.
CPC .... *G06F 17/30719* (2013.01); *G06F 17/2229* (2013.01); *G06F 17/2785* (2013.01)

(58) Field of Classification Search
CPC ............. G06F 17/2229; G06F 17/2785; G06F 17/30719
See application file for complete search history.

(56) References Cited

U.S. PATENT DOCUMENTS

| | | | |
|---|---|---|---|
| 2012/0197631 A1* | 8/2012 | Ramani | G06F 17/2755 704/9 |
| 2013/0097167 A1* | 4/2013 | St Jacques, Jr. | G06F 17/30011 707/737 |

OTHER PUBLICATIONS

Abdi et al., "The Kendall Rank Correlation Coefficient," Encyclopedia of Measurement and Statistics, 2007, 7 pages.
"Apache OpenNLP—Welcome to Apache OpenNLP," http://opennlp.apache.org/, 2010, 1 page.
Berander et al., "Requirements Prioritization," Engineering and Managing Software Requirements, 2005, 27 pages.

(Continued)

*Primary Examiner* — Taelor Kim
(74) *Attorney, Agent, or Firm* — Harrity & Harrity, LLP

(57) ABSTRACT

A device may receive text to be processed to prioritize text sections included in the text. The device may perform one or more prioritization techniques to prioritize the text sections. The one or more prioritization techniques may include at least one of: a semantic centrality analysis that indicates a degree to which a text section is semantically related to at least one other text section, an information content analysis that indicates a degree to which the text section includes information not included in the at least one other text section, or a combined analysis based on the semantic centrality analysis and the information content analysis. The device may prioritize the text sections, to form a set of prioritized text sections, based on performing the one or more prioritization techniques. The device may provide information that identifies the set of prioritized text sections.

20 Claims, 10 Drawing Sheets

(56) References Cited

OTHER PUBLICATIONS

Carrillo De Gea et al., "Requirements engineering tools: Capabilities, survey, and assessment," http://dx.doi.org/10.1016/j.infsof.2012.04.005, Information and Software Technology, 2012, 16 pages.
Cleland-Huang et al., "Automated classification of non-functional requirements," Requirements Engineering, 2007, 18 pages.
Dwarakanath et al., "Automatic Extraction of Glossary Terms from Natural Language Requirements," IEEE, 2013, 6 pages.
Hansen et al., "Challenges in Contemporary Requirements Practice," http://www.computer.org/csdl/proceedings/hicss/2010/3869/00/09-08-02.pdf, Proceedings of the 43$^{rd}$ Hawaii International Conference on System Sciences, IEEE, 2010, 11 pages.
Institute of Electrical and Electronics Engineers, Inc., "IEEE Recommended Practice for Software Requirements Specifications," IEEE Std 830-1998, 1998, 37 pages.
National Institute of Standards and Technology, "JAMA: Java Matrix Package," http://math.nist.gov/javanumerics/jama/, Jun. 18, 2013, 4 pages.
Karlsson et al., "An Evaluation of Methods for Prioritizing Software Requirements," Information and Software Technology, 39(14-15), 1998, 10 pages.
Kuhn et al., "Semantic Clustering: Identifying Topics in Source Code," Information and Software Technology, Jun. 26, 2006, 30 pages.
Lami, "QuARS: A Tool for Analyzing Requirements," Sep. 2005, 45 pages.
Landauer et al., "An Introduction to Latent Semantic Analysis," Discourse Processes, 1998, 41 pages.
Lehtola et al., "Requirements Prioritization Challenges in Practice," Lecture Notes in Computer Science, 2004, 12 pages.
Marcus et al., "Building a Large Annotated Corpus of English: The Penn Treebank," Computational Linguistics, vol. 19 No. 2, Jun. 1993, 18 pages.
Maynard et al., "NLP Techniques for Term Extraction and Ontology Population," Proceedings of the 2008 Conference on Ontology Learning and Population: Bridging the Gap between Text and Knowledge, 2008, 21 pages.
Misra et al., "Software Clustering: Unifying Syntactic and Semantic Features," Proceedings of the 2012 19$^{th}$ Working Conference on Reverse Engineering, Oct. 2012, 10 pages.
Misra et al., "Entity Disambiguation in Natural Language Text Requirements," Proceedings of the 2013 20$^{th}$ Asia-Pacific Software Engineering Conference, 2013, 8 pages.
Newman, "Analysis of weighted networks," Physical Review E, 70:056131, Department of Physics and Center for the Study of Complex Systems, University of Michigan, Jul. 20, 2004, 9 pages.
Neill et al., "Requirements Engineering: The State of the Practice," IEEE Software, vol. 20, No. 6, Nov./Dec. 2003, 7 pages.
Ravenflow, http://www.ravenflow.com/, Dec. 22, 2013, 1 page.
Raven Software, http://www.ravensoftware.com/, Jun. 18, 2013, 2 pages.
Rosenhainer, "Identifying Crosscutting Concerns in Requirements Specifications," Proceedings of the Workshop of Early Aspects: Aspect-Oriented Requirements Engineering and Architecture Design, 2004, 10 pages.
Saaty, "How to make a decision: The Analytic Hierarchy Process," European Journal of Operational Research 48, 1990, 18 pages.
Turney et al., "From Frequency to Meaning: Vector Space Models of Semantics," Journal of Artificial Intelligence Research 37, 2010, 48 pages.
United States Environmental Protection Agency, "Appendix E: Sample Functional Requirements Document for Web Sites Including Information About Brownfields Properties," http://clu-in.org/products/bfproperty/appendixe.htm, Jun. 18, 2013, 9 pages.
Verma et al., "Requirements Analysis Tool: A Tool for Automatically Analyzing Software Requirements Documents," 2008, 13 pages.
Zhao et al., "Criterion Functions for Document Clustering: Experiments and Analysis," Technical Report 01-40, Nov. 29, 2001, 30 pages.
Princeton University, "Wordnet: A lexical database for English," http://wordnet.princeton.edu/wordnet/download/, Apr. 2, 2013, 2 pages.
Wikipedia, "WordNet," Sep. 7, 2014, 12 pages.

\* cited by examiner

AUTOMATIC PRIORITIZATION OF NATURAL LANGUAGE TEXT INFORMATION

RELATED APPLICATION

This application claims priority to Indian Provisional Patent Application No. 4333/CHE/2013, filed on Sep. 25, 2013, the content of which is incorporated by reference herein in its entirety.

BACKGROUND

Text documents may include information with different degrees of importance. For example, a requirements document may specify requirements for use in system design and development, and the requirements may have varying degrees of importance.

SUMMARY

According to some possible implementations, a device may receive text to be processed to prioritize text sections included in the text. The device may perform one or more prioritization techniques to prioritize the text sections. The one or more prioritization techniques may include at least one of: a semantic centrality analysis that indicates a degree to which a text section is semantically related to at least one other text section, an information content analysis that indicates a degree to which the text section includes information not included in the at least one other text section, or a combined analysis based on the semantic centrality analysis and the information content analysis. The device may prioritize the text sections, to form a set of prioritized text sections, based on performing the one or more prioritization techniques. The device may provide information that identifies the set of prioritized text sections.

According to some possible implementations, a computer-readable medium may store instructions that, when executed by a processor, cause the processor to receive text to be processed to prioritize information included in the text. The instructions may cause the processor to perform one or more prioritization techniques to prioritize the information included in the text. The one or more prioritization techniques may include at least one of: a semantic centrality analysis that indicates an average degree to which a text section, included in the text, is semantically related to other text sections included in the text, or an information content analysis that indicates a degree to which the text section includes information not included in the other text sections. The instructions may cause the processor to prioritize the text section and the other text sections, to form a set of prioritized text sections, based on performing the one or more prioritization techniques. The instructions may cause the processor to provide information that identifies the set of prioritized text sections.

According to some possible implementations, a method may include receiving, by a device, text to be processed to prioritize information included in the text. The method may include performing, by the device, one or more prioritization techniques to prioritize the information included in the text. The one or more prioritization techniques may include at least one of: a semantic centrality analysis based on a degree of semantic relatedness between a set of text sections, included in the text, and other sets of text sections included in the text, or an information content analysis based on a relative importance of one or more first terms, included in the set of text sections, as compared to one or more second terms included in the other sets of text sections. The method may include assigning, by the device, relative priorities to the set of text sections and the other sets of text sections based on performing the one or more prioritization techniques. The method may include outputting, by the device, information that identifies the relative priorities assigned to the set of text sections and the other sets of text sections.

DETAILED DESCRIPTION

The following detailed description of example implementations refers to the accompanying drawings. The same reference numbers in different drawings may identify the same or similar elements.

A text document, such as a requirements document, may include one or more text sections, such as plain text, annotated text (e.g., text with terms, tags associated with the terms, etc.), or the like. In a requirements document, the text sections may describe one or more requirements for use in system design and development. A requirement may include an explanation of a desired property of a system. Analysis of a text that includes requirements or other information may include prioritizing the information included in the text (e.g., to prioritize system development steps). In some cases, such prioritization may be performed manually. However, manual prioritization may be dependent on user knowledge of the information, may involve excessive manual work, may be error-prone, or the like. Implementations described herein may utilize natural language processing to prioritize information (e.g., text sections, requirements, etc.) included in text, thereby increasing the speed and accuracy of information prioritization.

Figure 1:
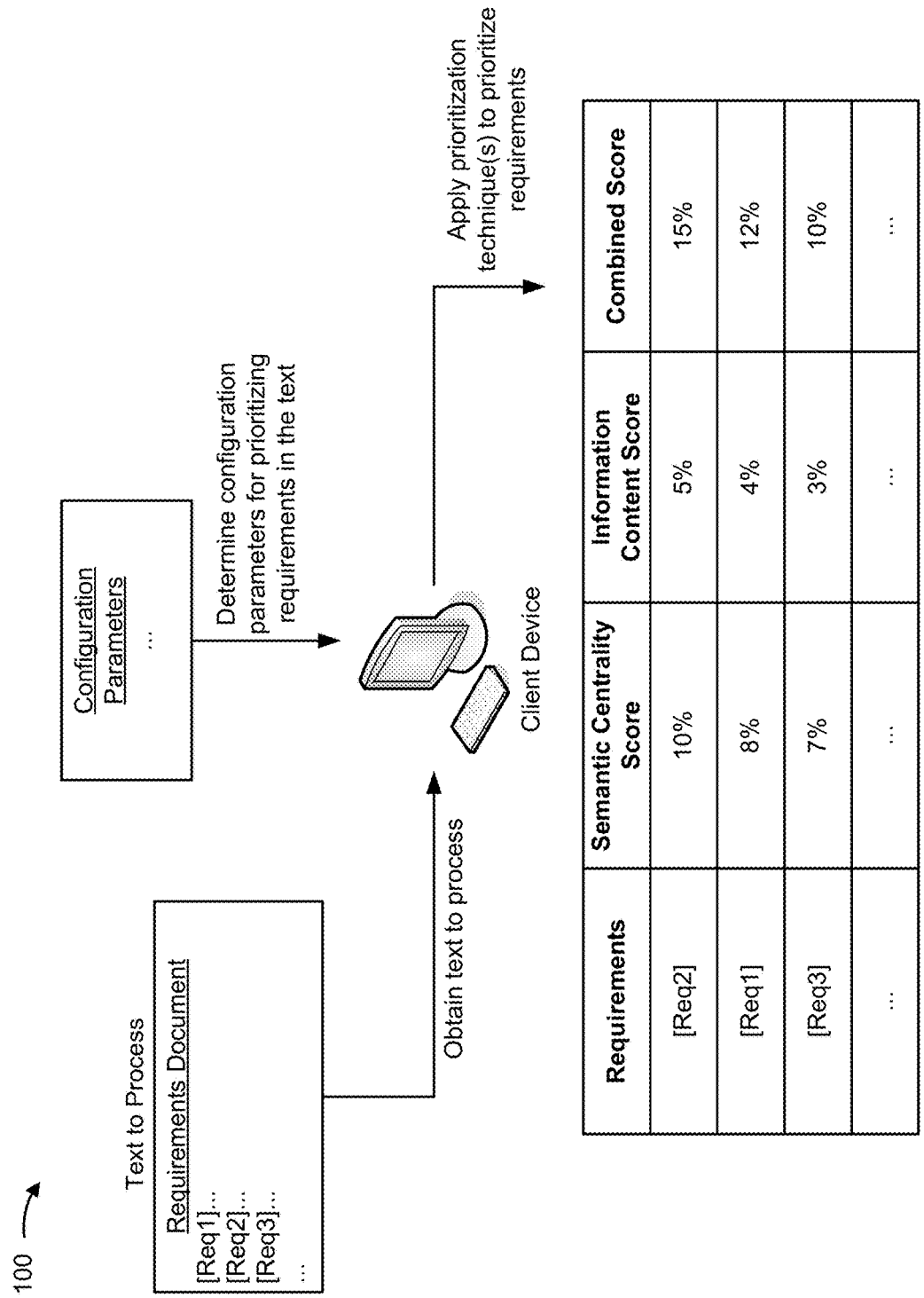
FIG. 1 is a diagram of an overview of an example implementation described herein.

FIG. 1 is a diagram of an overview of an example implementation 100 described herein. As shown in FIG. 1, a client device (e.g., a desktop computer, a laptop computer, etc.) may obtain text to be processed to prioritize information included in the text. For example, assume that the text is a requirements document that includes various requirements, identified as [Req1], [Req2], [Req3], etc. As further shown, the client device may determine configuration parameters to be used to prioritize the information included in the text. The configuration parameters may include, for example, a glossary of terms included in the text, various thresholds for prioritizing the information, an indication of whether to generate clusters of information, information that identifies one or more prioritization techniques to be used to prioritize the information, or the like.

As further shown in FIG. 1, the client device may apply a prioritization technique to prioritize information included in the text. As an example, the client device may calculate a semantic centrality score for the requirements, may generate an information content score for the requirements, may generate a combined score for the requirements, or the like. These and other prioritization techniques are described in more detail elsewhere herein. The client device may prioritize the requirements, and may provide the prioritized requirements (e.g., sorted in descending order of priority) for display. In this way, the client device may assist in prioritizing information included in the text, which may save time by eliminating manual processing of the text, may result in more accurate information prioritization, or the like. In some cases, a user may use the prioritized information to assist in scheduling design or development of a system.

In example implementation 100, requirements are used as an example. In practice, the client device may prioritize text sections that do not include requirements, or may prioritize information in a text document other than a requirements document, as described in more detail elsewhere herein.

Figure 2:
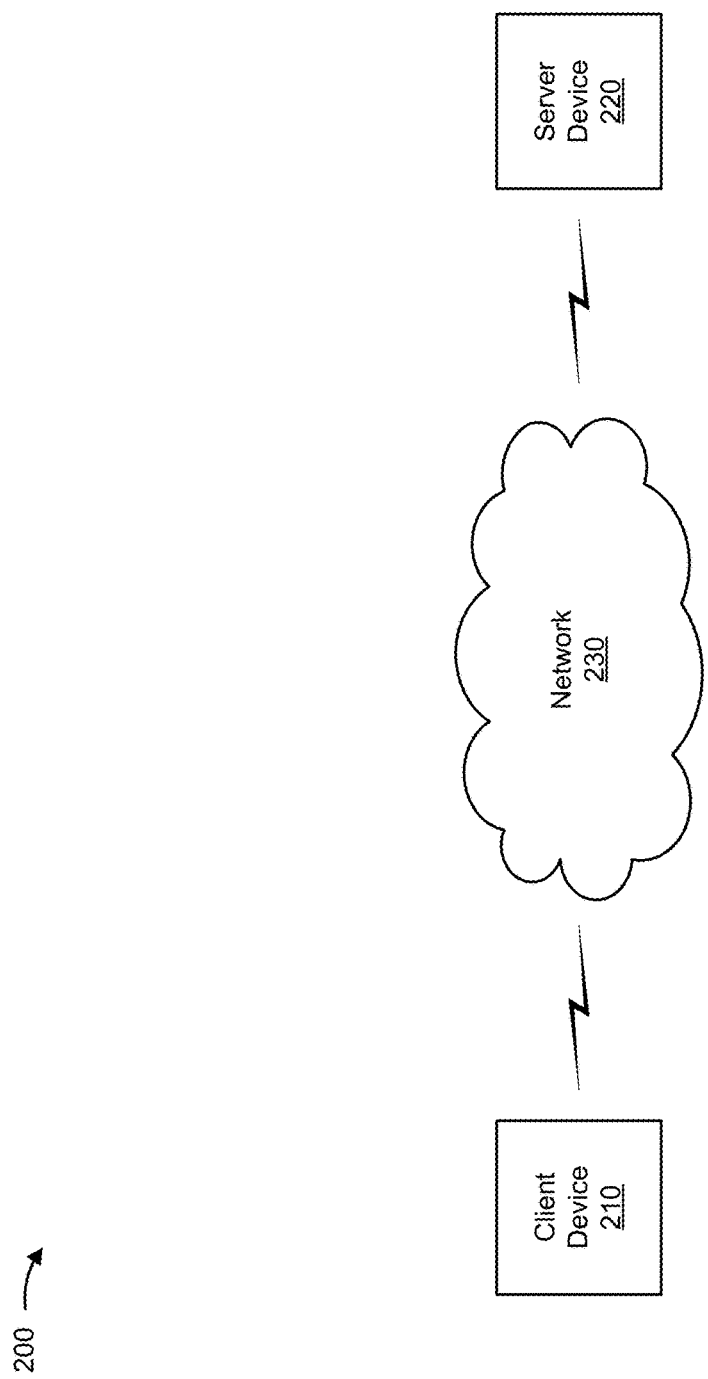
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, and a network 230. Devices of environment 200 may interconnect via wired connections, wireless connections, or a combination of wired and wireless connections.

Client device 210 may include one or more devices capable of receiving, generating, storing, processing, and/or providing text and/or information associated with text (e.g., a text section included in the text, a term included in the text, a tag for a term included in the text, a prioritization score, a prioritization technique, a term glossary, etc.). For example, client device 210 may include a computing device, such as a desktop computer, a laptop computer, a tablet computer, a server device, a mobile phone (e.g., a smart phone, a radiotelephone, etc.), or a similar device. In some implementations, client device 210 may receive text to process to prioritize text sections included in the text, and may process the text to prioritize the text sections. Client device 210 may utilize one or more prioritization techniques to prioritize text sections included in the text. In some implementations, client device 210 may receive information from and/or transmit information to server device 220 (e.g., text and/or information associated with text).

Server device 220 may include one or more devices capable of receiving, generating, storing, processing, and/or providing text and/or information associated with text. For example, server device 220 may include a computing device, such as a server device, a desktop computer, a laptop computer, a tablet computer, or a similar device. Server device 220 may perform one, more, or all operations described elsewhere herein as being performed by client device 210.

Network 230 may include one or more wired and/or wireless networks. For example, network 230 may include a public land mobile network (PLMN), a local area network (LAN), a wide area network (WAN), a metropolitan area network (MAN), a telephone network (e.g., the Public Switched Telephone Network (PSTN)), a cellular network, a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
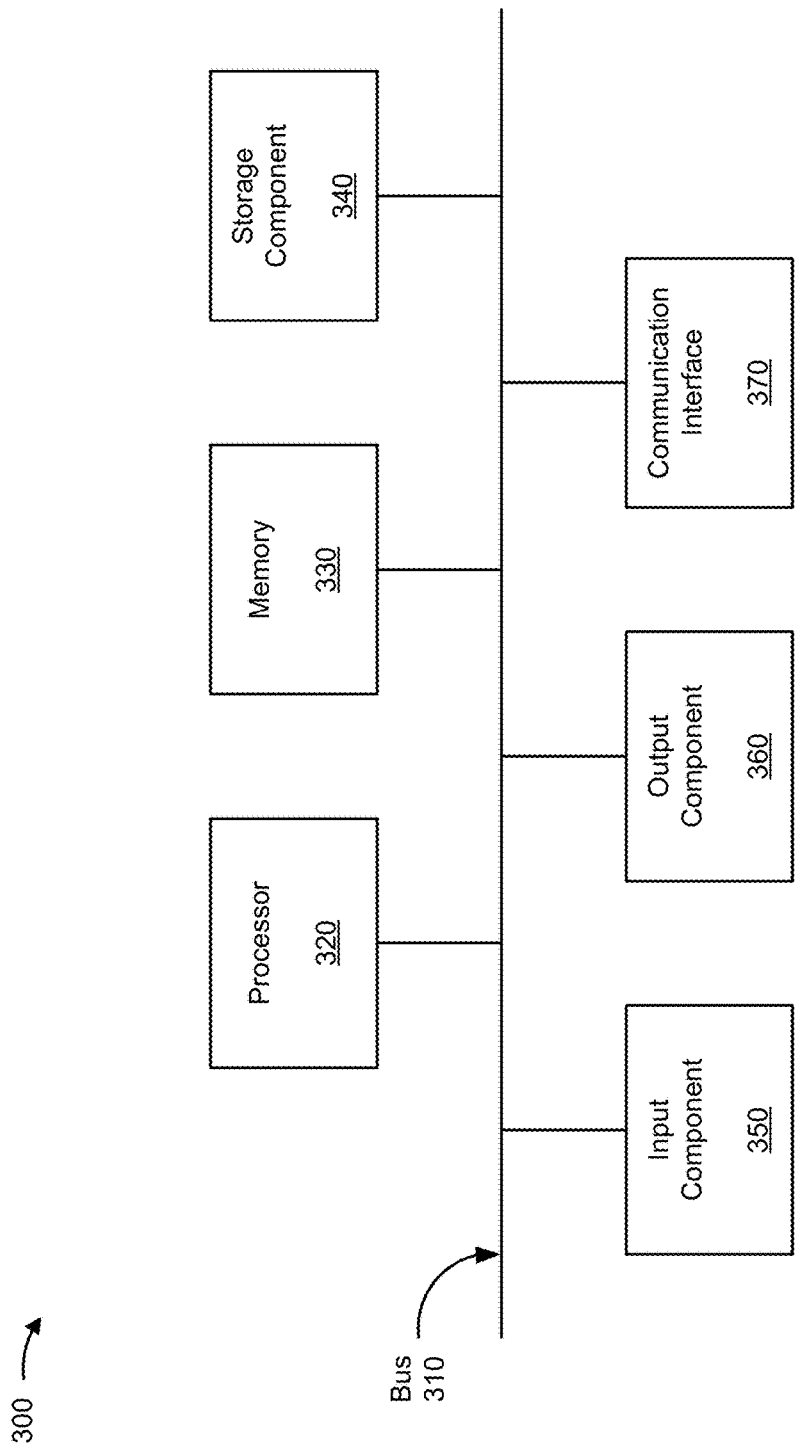
FIG. 3 is a diagram of example components of one or more devices of FIG. 2.

FIG. 3 is a diagram of example components of a device 300. Device 300 may correspond to client device 210 and/or server device 220. In some implementations, client device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
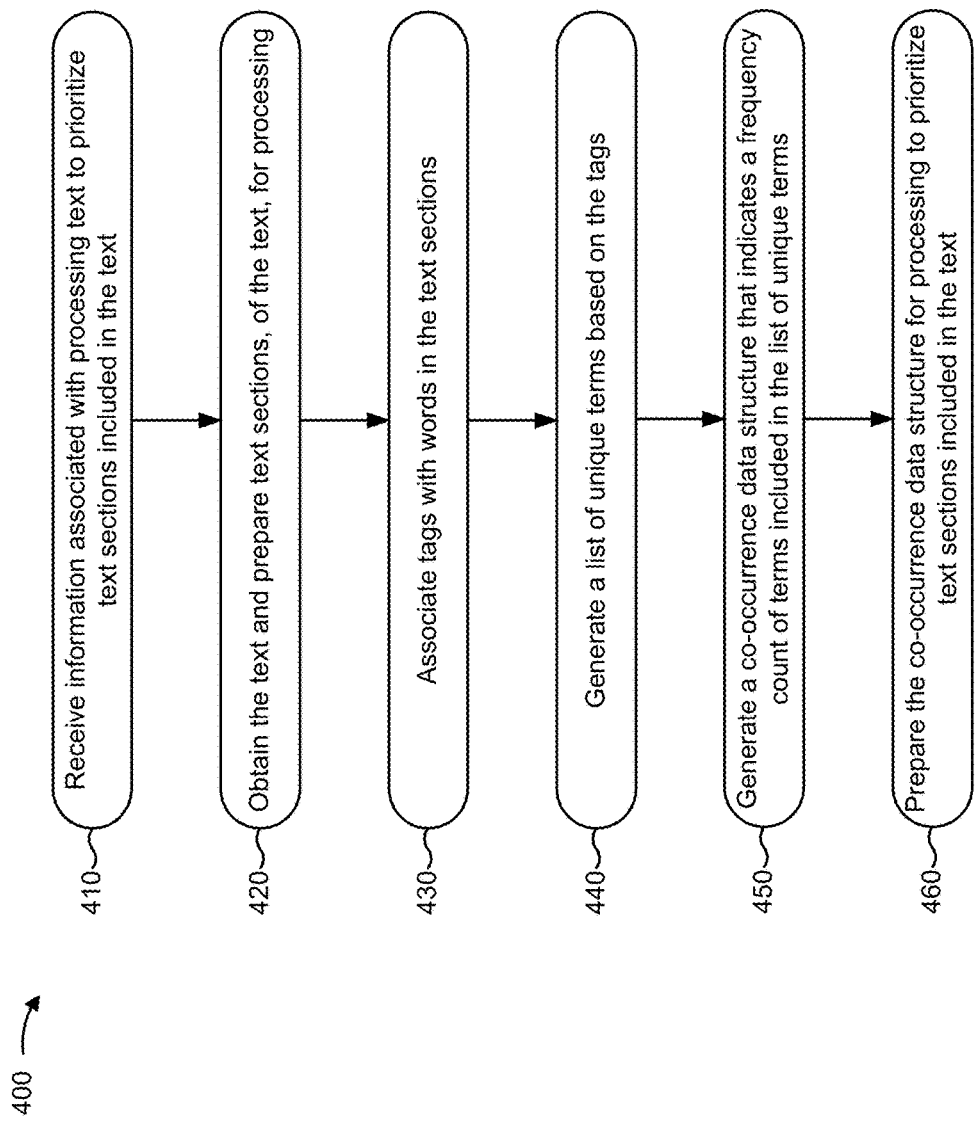
FIG. 4 is a flow chart of an example process for preparing text for processing to prioritize text sections included in the text.

FIG. 4 is a flow chart of an example process 400 for preparing text for processing to prioritize text sections included in the text. In some implementations, one or more process blocks of FIG. 4 may be performed by client device 210. In some implementations, one or more process blocks of FIG. 4 may be performed by another device or a group of devices separate from or including client device 210, such as server device 220.

As shown in FIG. 4, process 400 may include receiving information associated with processing text to prioritize text sections included in the text (block 410). For example, client device 210 may receive information that identifies text to be processed, may receive information that identifies a configuration parameter to be used to prioritize text sections included in the text, may receive information that identifies terms in the text, may receive information associated with a prioritization technique to be used to prioritize text sections included in the text, or the like. In some implementations, the a text section may include one or more requirements relating to the development or design of a system (e.g., a software program, a hardware system, a device, a product, a service, etc.).

Client device 210 may receive, via input from a user and/or another device, information that identifies text to be processed. For example, a user may input information identifying the text or a memory location at which the text is stored (e.g., local to and/or remote from client device 210). The text may include, for example, a document that includes text (e.g., a text file, a text document, a file that includes text and other information, such as images, etc.), a group of documents that include text (e.g., multiple files), a portion of a document that includes text (e.g., a portion indicated by a user, a portion identified by document metadata, etc.), and/or other information that includes text. In some implementations, client device 210 may receive an indication of one or more sections of text to be processed.

The text may include one or more terms. A term may refer to a set of characters, such as a single character, multiple characters (e.g., a character string), a combination of characters (e.g., in a particular order) that form a word, a combination of characters that form multiple words (e.g., a multi-word term, such as a phrase, a sentence, a paragraph, etc.), a combination of characters that form an acronym, a combination of characters that form an abbreviation of a word, a combination of characters that form a misspelled word, etc.

In some implementations, client device 210 may receive, via input from a user and/or another device, information and/or instructions for identifying terms in the text. For example, client device 210 may receive a tag list that identifies tags (e.g., part-of-speech tags, user-input tags, etc.) to be used to identify terms in the text. As another example, client device 210 may receive a term list (e.g., a glossary that identifies terms in the text, a dictionary that includes term definitions, a thesaurus that includes term synonyms or antonyms, a lexical database, such as WordNet, etc.) that identifies terms in the text (e.g., single-word terms, multi-word terms, etc.).

In some implementations, client device 210 may receive information that identifies a configuration parameter to be used to prioritize text sections included in the text. The configuration parameter may indicate a manner in which the text sections are to be prioritized, a manner in which prioritized text sections are to be provided for display, or the like. For example, the configuration parameter may include one or more thresholds described in more detail elsewhere herein (e.g., a threshold for grouping text sections into priority groups, a threshold for clustering text sections into text section clusters, a threshold for providing text sections and/or a text section cluster for display, etc.). Additionally, or alternatively, the configuration parameter may include an indication of whether to generate text section clusters to be prioritized, as described in more detail elsewhere herein.

As further shown in FIG. 4, process 400 may include obtaining the text and preparing text sections, of the text, for processing (block 420). For example, client device 210 may obtain the text, and may prepare the text for processing to prioritize text sections included in the text. In some implementations, a user may input information identifying the text or a memory location at which the text is stored. Based on the user input, client device 210 may retrieve the text. Additionally, or alternatively, client device 210 may provide a user interface via which a user may input text, and client device 210 may obtain the text based on the information input via the user interface. The text may include multiple files storing text, a single file storing text, a portion of a file storing text, multiple lines of text, a single line of text, a portion of a line of text, etc. The text may include untagged text and/or may include tagged text that has been annotated with one or more tags.

In some implementations, client device 210 may determine text sections, of the text, to be processed. For example, client device 210 may determine a manner in which the text is to be partitioned into text sections, and may partition the text into the text sections. A text section may include, for example, a sentence, a line, a paragraph, a page, a document, etc. Additionally, or alternatively, a text section may correspond to a requirement (e.g., in a requirements document) and/or may include a requirement. In some implementations, client device 210 may label text sections (e.g., may label a text section as a requirement), and may use the labels when processing the text. Additionally, or alternatively, client device 210 may process each text section separately (e.g., serially or in parallel).

Client device 210 may prepare the text (e.g., one or more text sections) for processing, in some implementations. For example, client device 210 may standardize the text to prepare the text for processing. In some implementations, preparing the text for processing may include adjusting characters, such as by removing characters, replacing characters, adding characters, adjusting a font, adjusting formatting, adjusting spacing, removing white space (e.g., after a beginning quotation mark; before an ending quotation mark; before or after a range indicator, such as a hyphen, a dash, a colon, etc.; before or after a punctuation mark, such as a percentage sign, etc.), or the like. For example, client device 210 may replace multiple spaces with a single space, may insert a space after a left parenthesis, a left brace, a left bracket, etc., may insert a space before a right parenthesis, a right brace, a right bracket, etc. In this way, client device 210 may use a space delimiter to more easily parse the text.

In some implementations, client device 210 may prepare the text for processing by expanding acronyms included in the text. For example, client device 210 may replace a short-form acronym, in the text, with a full-form term that the acronym represents (e.g., may replace "EPA" with "Environmental Protection Agency"). Client device 210 may determine the full-form term of the acronym by, for example, using a glossary or other input text, searching the text for consecutive words with beginning letters that correspond to the acronym (e.g., where the beginning letters "ex" may be represented in an acronym by "X") to identify a potential full-form term of an acronym, by searching for potential full-form terms that appear near the acronym in the text (e.g., within a threshold quantity of words), or the like.

As further shown in FIG. 4, process 400 may include associating tags with words in the text sections (block 430). For example, client device 210 may receive information that identifies one or more tags, and may associate the tags with words in the text based on tag association rules. The tag association rules may specify a manner in which the tags are to be associated with the words, based on characteristics of the words. For example, a tag association rule may specify that a singular noun tag ("/NN") is to be associated with words that are singular nouns (e.g., based on a language database, a context analysis, etc.).

A word may refer to a unit of language that includes one or more characters. A word may include a dictionary word (e.g., "gas") or may include a non-dictionary string of characters (e.g., "asg"). In some implementations, a word may be a term. Alternatively, a word may be a subset of a term (e.g., a term may include multiple words). Client device 210 may determine words in the text by determining characters identified by one or more delimiting characters, such as a space, a punctuation mark (e.g., a comma, a period, an exclamation point, a question mark, etc.), or the like.

As an example, client device 210 may receive a list of part-of-speech tags (POS tags) and tag association rules for tagging words in the text with the POS tags based on the part-of-speech of the word. Example part-of-speech tags include NN (noun, singular or mass), NNS (noun, plural), NNP (proper noun, singular), NNPS (proper noun, plural), VB (verb, base form), VBD (verb, past tense), VBG (verb, gerund or present participle), VBP (verb, non-third person singular present tense), VBZ (verb, third person singular present tense), VBN (verb, past participle), RB (adverb), RBR (adverb, comparative), RBS (adverb, superlative), JJ (adjective), JJR (adjective, comparative), JJS (adjective, superlative), CD (cardinal number), IN (preposition or subordinating conjunction), LS (list item marker), MD (modal), etc.

In some implementations, client device 210 may further process the tagged text to associate additional or alternative tags with groups of words that meet certain criteria. For example, client device 210 may associate an entity tag (e.g., ENTITY) with noun phrases (e.g., consecutive words with a noun tag, such as /NN, /NNS, /NNP, /NNPS, etc.), may associate a term tag (e.g., TERM) with unique terms (e.g., single-word terms, multi-word terms, etc.). In some implementations, client device 210 may only process terms with particular tags, such as noun tags, entity tags, verb tags, term tags, etc., when classifying terms in the text.

As further shown in FIG. 4, process 400 may include generating a list of unique terms based on the tags (block 440). For example, client device 210 may generate a list of unique terms associated with one or more tags. The list of unique terms (e.g., a term corpus) may refer to a set of terms (e.g., single word terms, multi-word terms, etc.) extracted from the text. In some implementations, the term corpus may include terms tagged with a noun tag and/or a tag derived from a noun tag (e.g., an entity tag applied to words with successive noun tags, a term tag, etc.). Additionally, or alternatively, the term corpus may include terms identified based on input provided by a user (e.g., input that identifies multi-word terms; input that identifies a pattern for identifying multi-word terms, such as a pattern of consecutive words associated with particular part-of-speech tags, a pattern of terms appearing at least a threshold quantity of times in the text; etc.), which may tagged with a term tag in some implementations. Additionally, or alternatively, the term corpus may include terms extracted from section headings of the text.

In some implementations, client device 210 may receive information that identifies stop tags or stop terms. The stop tags may identify tags associated with terms that are not to be included in the list of unique terms. Similarly, the stop terms may identify terms that are not to be included in the list of unique terms. When generating the list of unique terms, client device 210 may only add terms to the list that are not associated with a stop tag or identified as a stop term.

Additionally, or alternatively, client device 210 may convert terms to a root form when adding the terms to the list of unique terms. For example, the terms "processes," "processing," "processed," and "processor" may all be converted to the root form "process." Similarly, the term "devices" may be converted to the root form "device." Thus, when adding terms to the list of unique terms, client device 210 may convert the terms "processing device," "processed devices," and "processor device" into the root form "process device." Client device 210 may add the root term "process device" to the list of unique terms.

Client device 210 may generate a term corpus may by generating a data structure that stores terms extracted from the text, in some implementations. For example, client device 210 may generate a list of terms TermList of size t (e.g., with t elements), where t is equal to the number of unique terms in the text (e.g., where unique terms list TermList=[$term_1$, $term_2$, . . . , $term_t$]). Additionally, or alternatively, client device 210 may store, in the data structure, an indication of an association between a term and a tag associated with the term.

As further shown in FIG. 4, process 400 may include generating a co-occurrence data structure that indicates a frequency count of terms included in the list of unique terms (block 450). For example, client device 210 may generate a term co-occurrence matrix C of size t×d (e.g., with t rows and d columns), where t is equal to the number of unique terms in the text (e.g., where unique terms list TermList= [$term_1$, $term_2$, ..., $term_t$]), and where d is equal to the number of unique text sections (e.g., requirements) in the text (e.g., where unique requirements list D=[$Req_1$, $Req_2$, ..., $Req_d$]). The co-occurrence matrix C may store an indication of a quantity of times that each term appears in each text section (e.g., in each sentence, where a requirement is a sentence). For example, a value stored at C[i, j] may represent a quantity of times that the i-th term (e.g., $term_i$ from the TermList) is included in the j-th text section (e.g., $Req_j$ from D).

A single row in co-occurrence matrix C may be referred to as a term vector, and may represent a frequency of occurrence of a single term in each text section. A single column in co-occurrence matrix C may be referred to as a text section vector, and may represent the frequency of occurrence of each term, included in the list of unique terms TermList, in a single text section.

As further shown in FIG. 4, process 400 may include preparing the co-occurrence data structure for processing to prioritize text sections included in the text (block 460). For example, client device 210 may prepare the co-occurrence data structure for processing by combining alias terms. In this case, client device 210 may merge two or more rows (e.g., term vectors) in matrix C. Client device 210 may merge rows by summing values in the rows that correspond to the same column (e.g., text section vector). For example, client device 210 may merge a first row and a second row by summing the first value in the first row and the first value in the second row, by summing the second value in the first row and the second value in the second row, by summing the j-th value in the first row and the j-th value in the second row, etc. The summed values may be represented in a single row (e.g., a single term vector), and may be associated with one or more of the terms associated with the merged rows.

Client device 210 may merge rows based on a syntactic analysis and/or a semantic analysis of the terms associated with the rows. For example, client device 210 may merge rows based on determining that the terms associated with the rows are misspelled alias terms, short form alias terms, explicit alias terms, etc. Additionally, or alternatively, client device 210 may merge rows based on determining that an alias score, which indicates whether two terms are aliases of one another, satisfies a threshold.

In some implementations, client device 210 may prepare the co-occurrence data structure for processing by applying information theoretic weighting to adjust the values in matrix C. In this case, client device 210 may determine an inverse document frequency (idf) factor corresponding to a particular term (e.g., row) and text section (e.g., column) based on the total number of text sections d and the number of text sections in which the term appears. For example, client device 210 may determine the idf factor for a particular term and text section by dividing the total number of text sections d by the number of text sections in which the term appears, and by taking a logarithm of that quotient. In some implementations, client device 210 may apply information theoretic weighting to adjust the values of the co-occurrence matrix as follows:

$$C[i, j] = C[i, j] \times \ln\left(\frac{d}{n_i + 1}\right),$$

for each $i$ in $t$ and each $j$ in $d$.

where C[i,j] represents the co-occurrence matrix value (e.g., a frequency quantity) for a particular term in a particular text section, d represents the total number of text sections, and $n_i$ represents the number of text sections that include $term_i$.

In some implementations, when client device 210 determines that latent semantic indexing is to be performed (e.g., based on user input), client device 210 may generate a low-rank approximation of the co-occurrence matrix with the adjusted values. For example, client device 210 may apply singular value decomposition (SVD) to co-occurrence matrix C, to determine matrices U, Σ, and $V^T$, such that:

$$C = U\Sigma V^T,$$

where C represents the co-occurrence matrix (e.g., with or without the merged rows and/or with or without the adjusted values), U represents a t×t unitary matrix, Σ represents a t×d rectangular diagonal matrix with nonnegative real numbers on the diagonal, and $V^T$ (the conjugate transpose of V) represents a d×d unitary matrix. The diagonal values of Σ (e.g., $\Sigma_{i,i}$) may be referred to as the singular values of matrix C.

Client device 210 may determine a truncation value k for reducing the size of matrix U, which may be useful for calculating a latent semantic similarity score for two terms. Client device 210 may determine a quantity of non-zero singular values (e.g., the quantity of non-zero entries in Σ), which may be referred to as the rank r of matrix C, and may set the truncation value k equal to the rank r of matrix C. Alternatively, client device 210 may set the truncation value k equal to $(t \times d)^{0.2}$. In some implementations, client device 210 may set the truncation value k as follows:

If $(t \times d)^{0.2} < r$, then $k = (t \times d)^{0.2}$,

Otherwise, k=r.

Client device 210 may truncate the matrix U by removing columns from U that are not included in the first k columns (e.g., the truncated matrix U may only includes columns 1 through k of the original matrix U). The rows in truncated matrix U may correspond to term vectors in the latent semantic indexing (LSI) space.

In this way, client device 210 may generate a co-occurrence data structure, which may be used to prioritize text sections (e.g., requirements) included in the text, as described in more detail in connection with FIG. 6 and FIG. 8.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
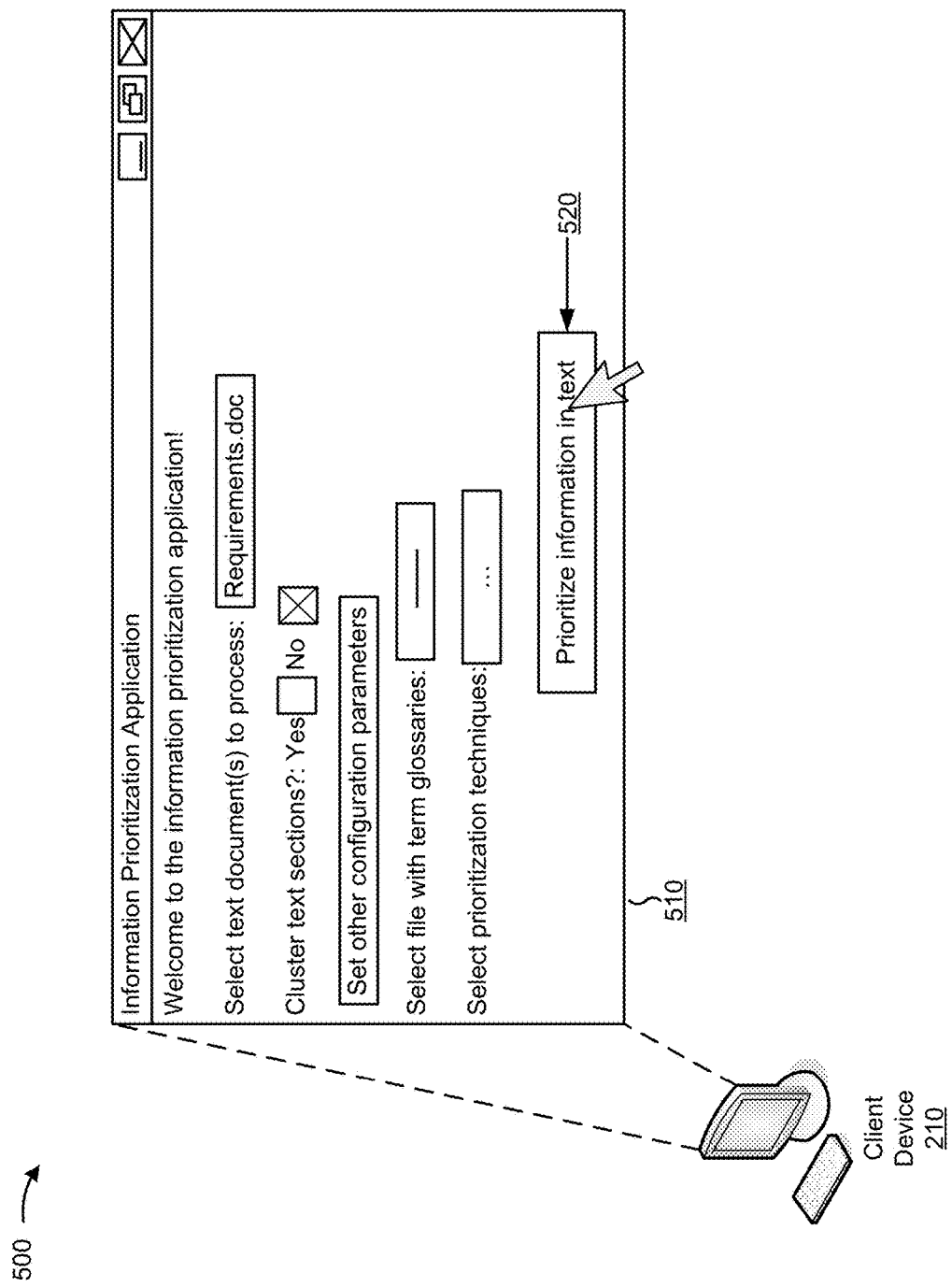
FIGS. 5A and 5B are diagrams of an example implementation relating to the example process shown in FIG. 4.
Figure 5B:
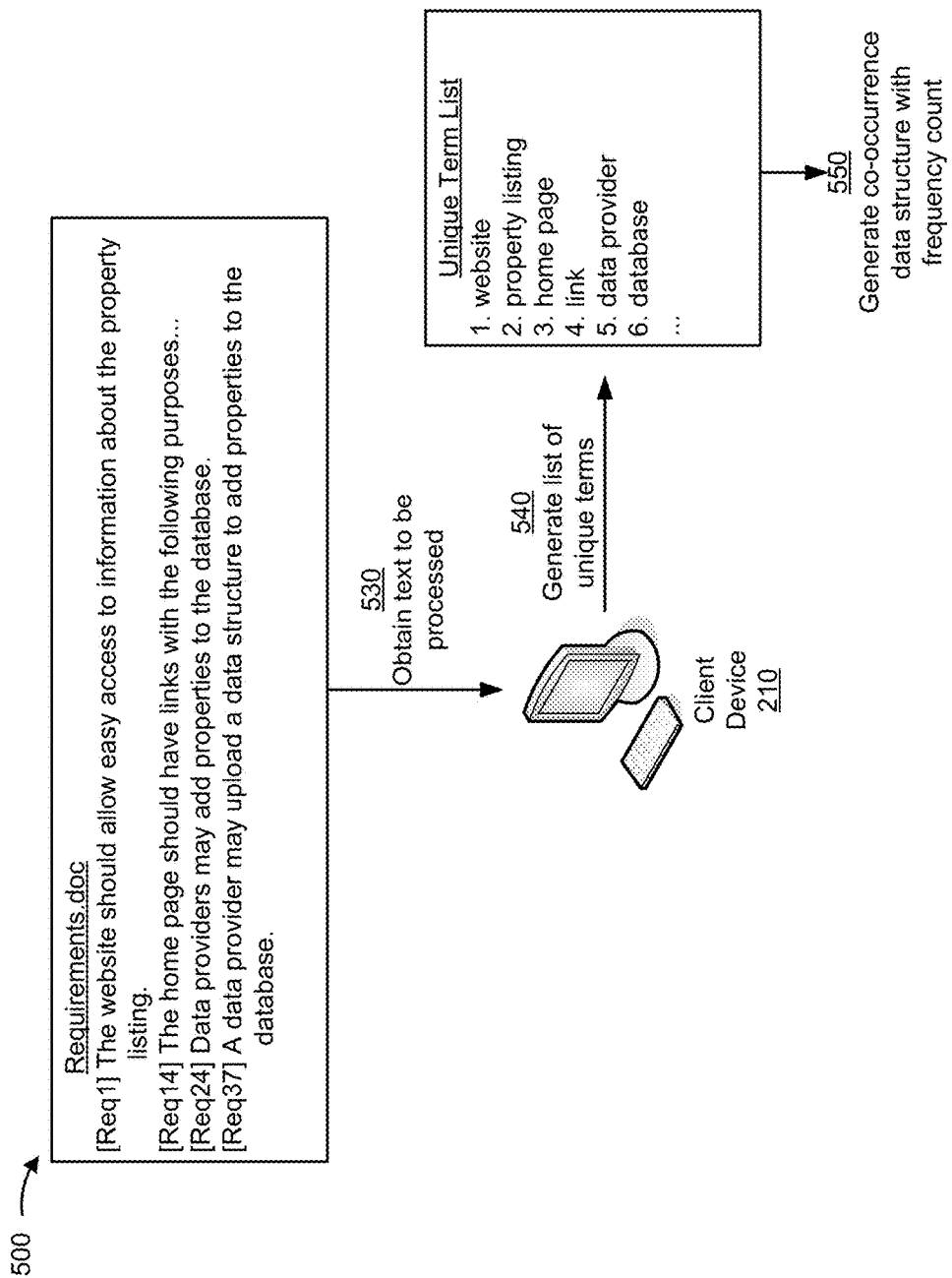

FIGS. 5A and 5B are diagrams of an example implementation 500 relating to example process 400 shown in FIG. 4. FIGS. 5A and 5B show an example of preparing text for processing to prioritize text sections included in the text.

As shown in FIG. 5A, and by reference number 510, assume that client device 210 provides (e.g., for display) an information prioritization application via which a user may specify options to be applied by client device 210 when prioritizing information included in text. As shown, the user may provide input identifying text to process (e.g., one or more text documents, such as a requirements document entitled "Requirements.doc"), may provide input identifying whether to generate text section clusters to be prioritized, may provide input identifying one or more other configuration parameters associated with prioritizing text sections included in the text (e.g., one or more thresholds), may provide input identifying a glossary to be used to identify terms in the text or to be used when prioritizing the text sections (e.g., to determine term definitions, synonyms, antonyms, etc.), and may provide input identifying one or more prioritization techniques to be used by client device 210 to prioritize text sections included in the text.

For example, the user may provide input identifying one or more prioritization techniques described in more detail elsewhere herein, such as a semantic centrality analysis, an information content analysis, a combined analysis, or the like. Additionally, or alternatively, the user may provide input identifying other options for processing the text and/or providing output based on processing the text, such as input that indicates whether to provide prioritization scores (e.g., semantic centrality scores, information specificity scores, combined scores, etc.) for display, input that indicates a manner in which output information is to be provided for display (e.g., using priority groups, using a prioritized list, etc.), or the like. As shown by reference number 520, when the user has finished specifying options for processing the text, the user may interact with an input mechanism (e.g., a button, a link, etc.) to cause client device 210 to prioritize text sections included in the text.

As shown in FIG. 5B, client device 210 processes the text based on the user interaction. As shown by reference number 530, client device 210 obtains the text to be processed based on a text document identified by the user. As shown, assume that the text is a text document entitled "Requirements.doc," and that client device 210 identifies the following requirements (among others) in the text document:

[Req1] The website should allow easy access to information about the property listing.
[Req14] The home page should have links with the following purposes . . .
[Req24] Data providers may add properties to the database.
[Req37] A data provider may upload a data structure to add properties to the database.

Assume that the above requirements are included in separate text sections, such as separate sentences and/or paragraphs. As shown by reference number 540, client device 210 processes the text document to generate a list of unique terms. As shown, assume that client device 210 determines the following six terms from the above requirements:

1. website
2. property listing
3. home page
4. link
5. data provider
6. database As shown by reference number 550, assume that client device 210 uses the unique term list to generate a co-occurrence data structure that indicates a frequency count of the terms with respect to the requirements (e.g., a count of the quantity of times each term appears in each requirement or text section). Client device 210 may apply one or more prioritization techniques to the co-occurrence data structure, as described in more detail elsewhere herein. By generating the list of unique terms and/or the co-occurrence data structure, client device 210 may process the text more efficiently than if the text were processed without first creating the list of unique terms and/or the co-occurrence data structure.

As indicated above, FIGS. 5A and 5B are provided merely as an example. Other examples are possible and may differ from what was described with regard to FIGS. 5A and 5B.

Figure 6:
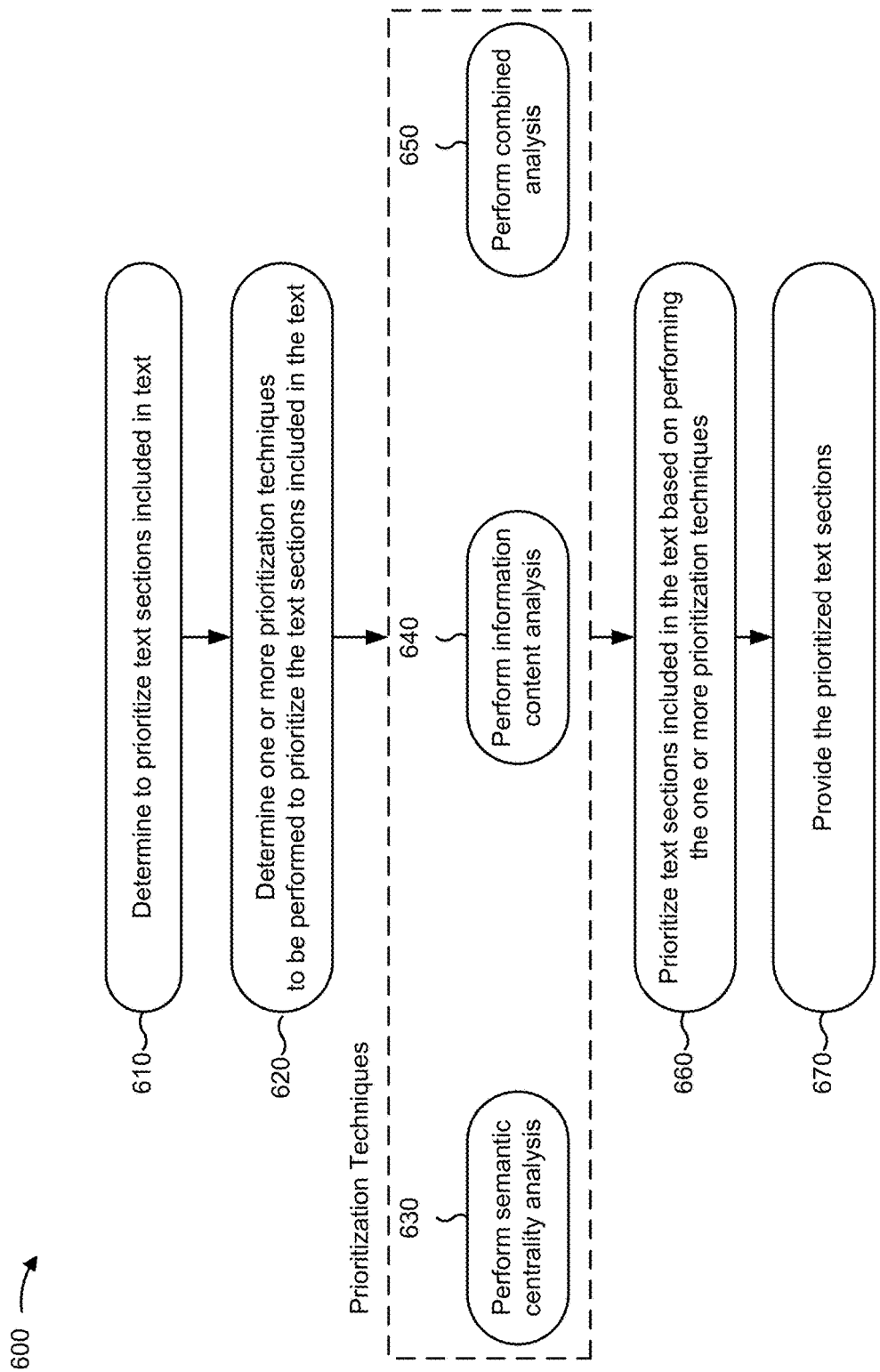
FIG. 6 is a flow chart of an example process for processing text to prioritize text sections included in the text.

FIG. 6 is a flow chart of an example process 600 for processing text to prioritize text sections included in the text. In some implementations, one or more process blocks of FIG. 6 may be performed by client device 210. In some implementations, one or more process blocks of FIG. 6 may be performed by another device or a group of devices separate from or including client device 210, such as server device 220.

As shown in FIG. 6, process 600 may include determining to prioritize text sections included in text (block 610), and determining one or more prioritization techniques to be performed to prioritize the text sections included in the text (block 620). For example, a user may provide input that causes client device 210 to prioritize text sections included in the text. Additionally, or alternatively, client device 210 may determine one or more prioritization techniques to be performed to prioritize the text sections included in the text. In some implementations, client device 210 may receive user input that specifies the prioritization technique(s) to be performed. Additionally, or alternatively, client device 210 may determine one or more default prioritization techniques to be performed (e.g., based on information stored in a data structure). In some implementations, client device 210 may determine the prioritization technique(s) based on a characteristic of the text (e.g., a size of the text, contents included in the text, a quantity of text sections in the text, a quantity of terms in the text, a file format of a file that includes the text, a type of document that includes the text, etc.).

A prioritization technique may include a semantic centrality analysis, an information content analysis, a combined analysis, or the like. Except as otherwise described herein, client device 210 may perform a single prioritization technique, or may perform any combination of multiple prioritization techniques. When performing a combination of multiple prioritization techniques, client device 210 may perform the multiple prioritization techniques in any order, except as otherwise described herein. Additionally, or alternatively, client device 210 may perform the multiple prioritization techniques in parallel.

As further shown in FIG. 6, process 600 may include performing a semantic centrality analysis (block 630). For example, client device 210 may perform a semantic centrality analysis by calculating a semantic centrality score (e.g., an average semantic similarity score) between a particular text section (e.g., requirement) and other text sections included in the text (e.g., all text sections, text sections identified as requirements, text sections with a particular label, etc.). A semantic centrality score for a text section may indicate a degree to which the text section is semantically related to other text sections in the text (e.g., with a higher score indicating that the text section is more semantically related, on average, to other text sections than a text section with a lower score). Client device 210 may calculate a semantic centrality score for multiple text sections, and may prioritize the text sections based on the semantic centrality scores (e.g., in descending order, in ascending order, etc.).

As an example, client device 210 may calculate the semantic centrality score based on an average of semantic similarity scores. In this case, client device 210 may calculate a semantic similarity score between text sections based on a cosine distance between the text sections. Client device 210 may calculate the cosine distance for two vectors X and X' where each vector contains n items (e.g., text section vectors X and X' that each contain n terms). The cosine distance may be calculated as the cosine of the angular distance between text section vectors, and may be calculated as follows:

$$\text{Cosine}(X, X', n) = \frac{\sum_{l=1}^{l=n} X[l]X'[l]}{\sqrt{\sum_{l=1}^{l=n} X[l]^2} \sqrt{\sum_{l=1}^{l=n} X'[l]^2}}$$

In some implementations, client device 210 may determine to perform latent semantic indexing (e.g., based on user input). In this case, the semantic similarity score may be calculated as SemSim[i, j]=Cosine(V[i],V[j],k), where V[i] and V[j] are text section vectors from the truncated matrix V, where i and j are included in [1, . . . , d], and where i<j.

In some implementations, client device 210 may determine not to perform latent semantic indexing (e.g., based on user input). In this case, client device 210 may calculate a similarity score as SemSim[i, j]=Cosine($C^T$[i],$C^T$[j],t), where $C^T$[i] and $C^T$[j] are text section vectors from the transposed co-occurrence matrix $C^T$, where i and j are included in [1, . . . , d], and where i<j.

The SemSim score may range from [−1, 1], where −1 indicates that the terms are antonyms, 0 indicates that the terms are statistically independent, and 1 indicates that the terms are synonyms. In other words, SemSim[i, j] may indicate a degree of relatedness between two text sections in the context of the text.

In some implementations, client device 210 may calculate the semantic centrality score as an average semantic similarity score for each text section included in the text. For example, client device 210 may calculate an average latent semantic similarity score μ[i], for requirement i, as follows:

$$\mu[i] = \frac{\sum_{Req_j \in D_i} SemSim[i, j]}{|D_i|}$$

In the above expression, $D_i$ may represent a set of requirements to be analyzed, and $|D_i|$ may represent the quantity of requirements included in the set of requirements. In some implementations, $D_i$ may include all requirements in the text. Additionally, or alternatively, $D_i$ may include a set of requirements that satisfy a condition. For example, $D_i$ may include a set of requirements with a semantic similarity score that satisfies a threshold $th_{sc}$ (e.g., a threshold of 0.1, 0.25, 0.3, etc.), to ensure that weak semantic associations do not bias the average latent semantic similarity score:

Let $D_i$={$Req_j \in D$|SemSim[i,j]>$th_{sc}$}

While the semantic centrality score is described above as being calculated using a particular technique, client device 210 may use one or more other techniques to calculate the semantic centrality score. Client device 210 may use semantic centrality scores for multiple text sections to prioritize the text sections, as described in more detail in connection with block 660.

As further shown in FIG. 6, process 600 may include performing an information content analysis (block 640). For example, client device 210 may perform an information content analysis by calculating an information specificity score that indicates a degree to which a particular text section includes specific information not included in other text sections (e.g., all text sections, text sections identified as requirements, text sections with a particular label, etc.). In this case, a first text section that includes information included in a higher quantity of other text sections would be associated with a lower information specificity score (e.g., indicating that the first text section includes less specific information), and a second text section that includes information included in a lower quantity of other text sections would be associated with a higher information specificity score (e.g., indicating that the second text section includes more specific information). Additionally, or alternatively, the information specificity score may indicate a relative importance of terms included in a particular text section as compared to terms included in other text sections. Client device 210 may calculate an information specificity score for multiple text sections, and may prioritize the text sections based on the information specificity score (e.g., in descending order, in ascending order, etc.).

As an example, client device 210 may calculate an information specificity score Info[i], for requirement i, as follows:

Info[i]=$\Sigma_{k=1}^t C[i][k]$=sum of tf-idf for each term occurring in $Req_i$ In the above expression, C may represent a term co-occurrence matrix (as described elsewhere herein), and t may represent the number of unique terms in the text (as described elsewhere herein). In other words, Info[i] may represent a sum of term frequency-inverse document frequency (tf-idf) scores for each term included in requirement i. The tf-idf score for a term may indicate a relative importance of the term as compared to other terms in the text.

While the information specificity score is described above as being calculated using a particular technique, client device 210 may use one or more other techniques to calculate the information specificity score. Client device 210 may use the information specificity scores for multiple text sections to prioritize the text sections, as described in more detail in connection with block 660.

As further shown in FIG. 6, process 600 may include performing a combined analysis (block 650). For example, client device 210 may perform a combined analysis by calculating a semantic centrality score and an information specificity score, as described above, and combining these scores. Client device 210 may calculate a combined score for multiple text sections, and may prioritize the text sections based on the combined score (e.g., in descending order, in ascending order, etc.).

In some implementations, client device 210 may sum the semantic centrality score and the information specificity score to calculate the combined score. Additionally, or alternatively, client device 210 may average the semantic centrality score and the information specificity score to calculate the combined score. Additionally, or alternatively, client device 210 may apply weights (e.g., different weights, user-input weights, default weights, etc.) to the semantic centrality score and/or the information specificity score when calculating the combined score. As an example, client device 210 may calculate the combined score as follows:

CS=α×SCS+(1−α)×ISS

In the above expression, CS may represent the combined score, SCS may represent the semantic centrality score, ISS may represent the information specificity score, and α may represent a weight value, such as a weight value between 0 and 1 (inclusive). Alternatively, the weight values applied to the semantic similarity score and the information specificity score may not sum to 1.

Client device 210 may use the combined scores for multiple text sections to prioritize the text sections, as described in more detail in connection with block 660.

As further shown in FIG. 6, process 600 may include prioritizing text sections included in the text based on performing the one or more prioritization techniques (block 660), and providing the prioritized text sections (block 670). For example, client device 210 may prioritize text sections based on semantic centrality scores, information specificity scores, combined scores, etc., associated with the text sections. As an example, client device 210 may prioritize the text sections by sorting the text sections using a score (e.g., in descending order of scores). In this case, client device 210 may assign a higher priority to a text section associated with a higher score, and may assign a lower priority to a text section associated with a lower score. In some implementations, if multiple text sections have the same score, client device 210 may assign a same priority to the text sections. Client device 210 may provide (e.g., may output for display) a list of text sections, sorted by scores (e.g., semantic centrality scores, information specificity scores, combined scores, or the like).

In some implementations, client device 210 may output all of the prioritized text sections. Additionally, or alternatively, client device 210 may identify a subset of the text sections, and may output the subset (e.g., for display). For example, client device 210 may identify a subset of text sections with a score that satisfies a threshold (e.g., a default threshold, a user-specified threshold, etc.). Additionally, or alternatively, client device 210 may identify a quantity or a percentage of text sections with the highest scores (e.g., a default quantity or percentage, such as 5%, a user-specified quantity or percentage, etc.).

Additionally, or alternatively, client device 210 may classify text sections into priority groups based on the scores. For example, client device 210 may assign the first quarter of text sections with the highest scores to a high priority group, may assign the second quarter of text sections with the next-highest scores to an above average priority group, may assign the third quarter of text sections with the next-highest scores to a below average priority group, and may assign the fourth quarter of text sections with the lowest scores to a low priority group. Client device 210 may output information that indicates a priority group to which a text section belongs, may exclude text sections in a particular priority group (e.g., a low priority group) from being provided for display, or the like.

In this way, client device 210 may increase the speed and accuracy with which information, included in text, is prioritized. This may assist a user in determining important information included in the text.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
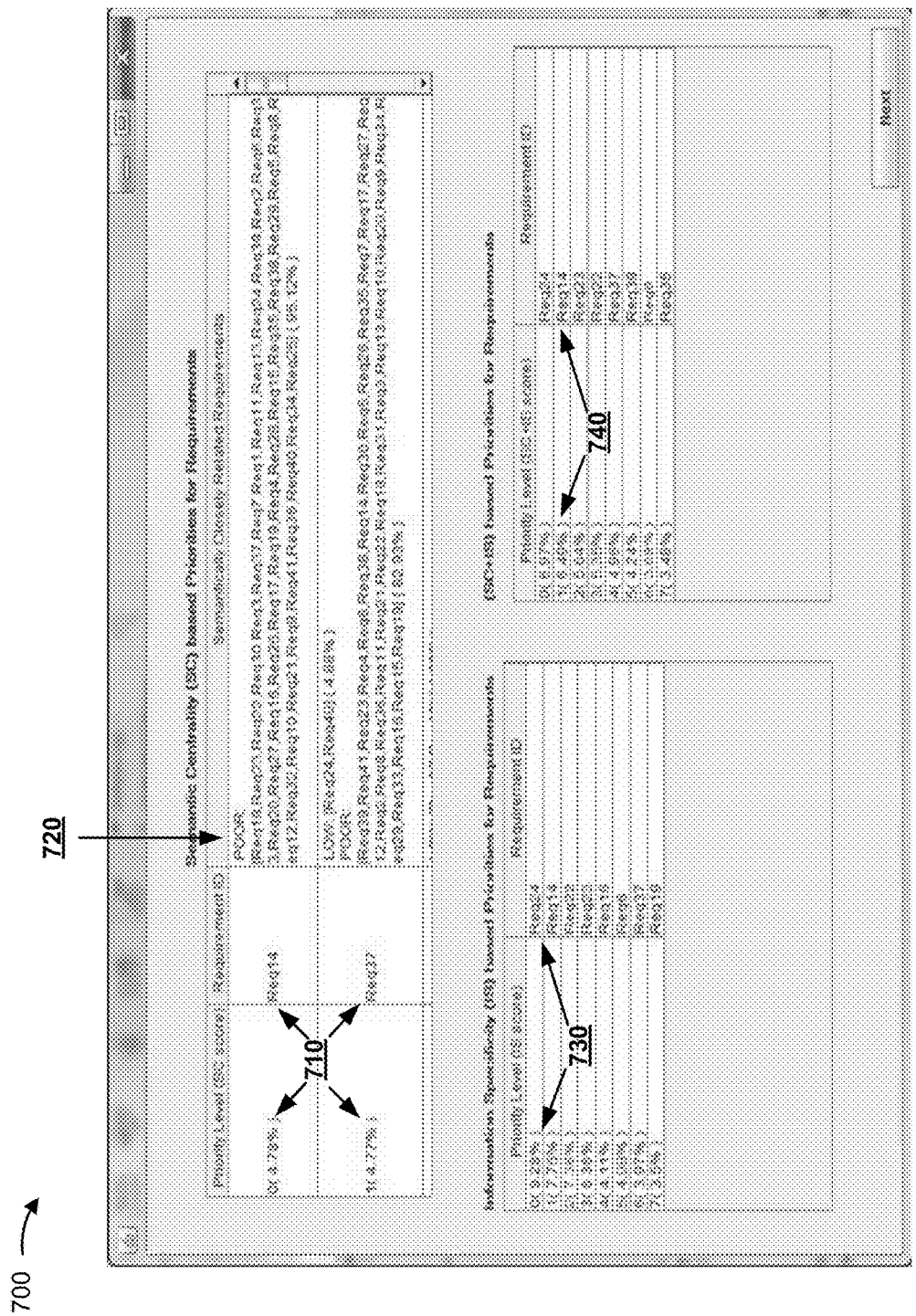
FIG. 7 is a diagram of an example implementation relating to the example process shown in FIG. 6.

FIG. 7 is a diagram of an example implementation 700 relating to example process 600 shown in FIG. 6. FIG. 7 shows example output based on processing text to prioritize requirements included in the text.

As shown in FIG. 7, assume that client device 210 has calculated semantic centrality scores, information specificity scores, and combined scores for the requirements included in the requirements document shown in FIG. 5B. As shown by reference number 710, assume that [Req14] is associated with the highest semantic centrality score (e.g., 4.78), and that [Req37] is associated with the next-highest semantic centrality score (e.g., 4.77). Based on these scores, client device 210 lists [Req14] before [Req37] on a user interface.

As shown by reference number 720, client device 210 also outputs information identifying a semantic relationship between [Req14] and other requirements included in the requirements document. Client device 210 may determine the semantic relationship based on a semantic similarity score between [Req14] and other requirements. For example, assume that [Req14] has a poor semantic similarity score with [Req18], [Req23], and the other requirements shown by reference number 720.

As shown by reference number 730, assume that [Req24] is associated with the highest information specificity score (e.g., 9.28), that [Req14] is associated with the next-highest information specificity score (e.g., 7.76), etc. Based on these scores, client device 210 lists [Req24] before [Req14] on the user interface.

As shown by reference number 740, assume that [Req24] is associated with the highest combined score (e.g., 6.97), that [Req14] is associated with the next-highest combined score (e.g., 6.49), etc. Based on these scores, client device 210 lists [Req24] before [Req14] on the user interface.

As indicated above, FIG. 7 is provided merely as an example. Other examples are possible and may differ from what was described with regard to FIG. 7.

Figure 8:
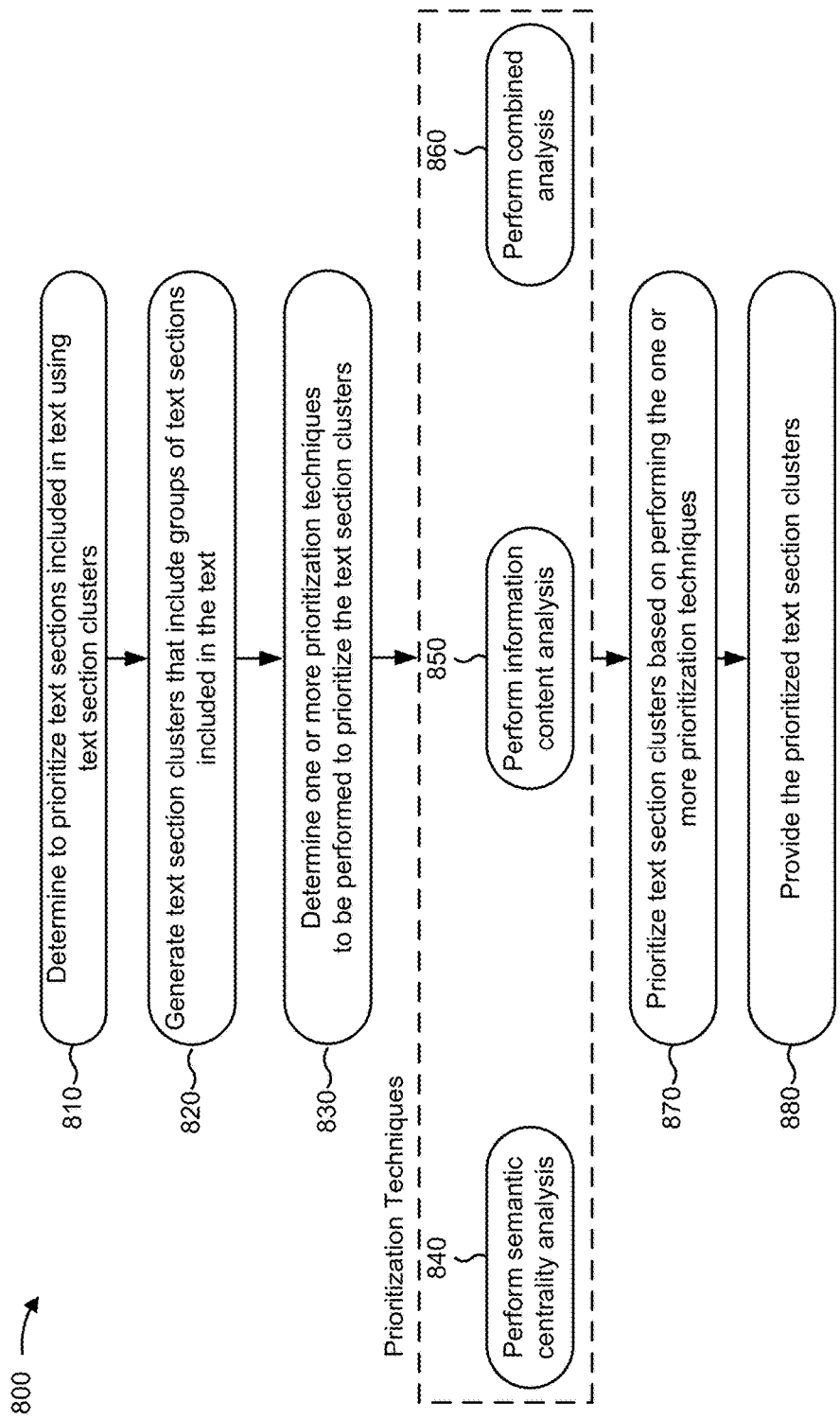
FIG. 8 is a flow chart of an example process for processing text to prioritize clusters of text sections included in the text.

FIG. 8 is a flow chart of an example process 800 for processing text to prioritize clusters of text sections included in the text. In some implementations, one or more process blocks of FIG. 8 may be performed by client device 210. In some implementations, one or more process blocks of FIG. 8 may be performed by another device or a group of devices separate from or including client device 210, such as server device 220.

As shown in FIG. 8, process 800 may include determining to prioritize text sections included in text using text section clusters (block 810). For example, a user may provide input that causes client device 210 to prioritize text sections included in the text, as described herein in connection with block 610 of FIG. 6. Additionally, or alternatively, the user may provide input that causes client device 210 to group the text sections into text section clusters that are to be prioritized (e.g., based on a configuration parameter). A text section cluster may include, for example, a group of sentences, a group of requirements, a group of terms, or the like.

As further shown in FIG. 8, process 800 may include generating text section clusters that include groups of text sections included in the text (block 820). For example, client device 210 may group text sections into text section clusters, such that text sections within a particular cluster are more closely semantically related (e.g., more similar) to one another than text sections across different clusters. As an example, client device 210 may generate text section clusters such that a first text section and a second text section, that are both included in a first cluster, are more semantically related to one another than to a third text section that is included in a second cluster.

In some implementations, client device 210 may use one or more configuration parameters (e.g., a default configuration parameter, a user-specified configuration parameter, etc.) to generate the text section clusters. For example, client device 210 may use a minimum semantic relatedness threshold, $\vartheta$, to control a minimum threshold of semantic relatedness (e.g., a minimum semantic similarity score) between any two text sections in a text section cluster (e.g., $\vartheta=25\%$). As another example, client device 210 may use a mean semantic relatedness threshold, $\tau$, to control a mean (e.g., average) semantic relatedness (e.g., an average semantic similarity score) among text sections in a text section cluster (e.g., $\tau=75\%$).

As an example, client device 210 may generate text section clusters based on sorting the pairs of text sections (e.g., in descending order) based on a semantic similarity score between each pair of text sections. Client device 210 may select a particular quantity or percentage of text section pairs with the highest semantic similarity scores. For example, client device 210 may select the top ϑ% of text section pairs with the highest semantic similarity scores (e.g., based on the minimum semantic relatedness threshold). Additionally, or alternatively, client device 210 may select text section pairs with a semantic similarity score greater than a threshold (e.g., zero). Client device 210 may form a list of text section pairs based upon the semantic similarity scores between pairs (e.g., a list that includes the top ϑ% of text section pairs with a semantic similarity score greater than zero).

From the list of text section pairs, client device 210 may select a particular text section pair based on the value of τ (e.g., based on the mean semantic relatedness). For example, client device 210 may select, from the list of text section pairs, the text section pair that falls τ % from the top of the list. Client device 210 may set this selected text section pair as a control text section pair. Client device 210 may set a control threshold based on the semantic similarity score between the control text section pair. In other words, client device 210 may calculate:

conTH=SemSim[$Req_a$, $Req_b$]

In the above expression, conTH may represent the control threshold, $Req_a$ may represent a first text section that is part of the control text section pair, and $Req_b$ may represent a second text section that is part of the control text section pair.

Client device 210 may initialize the text section clusters so that each text section cluster includes one text section. For example, for each text section cluster θ[i], client device may initialize the text section cluster as θ[i]=[$Req_i$]. Client device 210 may then calculate an average similarity score between each pair of clusters. Client device 210 may merge clusters with an average similarity score greater than the control threshold conTH. Client device 210 may continue to merge clusters in this manner (e.g., creating new clusters and calculating average similarity scores associated with the new clusters) until no cluster pairs remain with an average similarity score that is greater than the control threshold conTH. In this case, client device 210 may output the remaining clusters as the text section clusters to be prioritized.

Client device 210 may calculate the average similarity score as a sum of semantic similarity scores between each text section in a first cluster and each text section in a second cluster, divided by the sum (or, in some cases, the product) of the quantity of text sections included in the first cluster and the quantity of text sections included in the second cluster. In other words, for each pair of clusters (θ[i], θ[j]), with i<j, client device 210 may calculate an average similarity score AvgSim[i, j] as follows:

$$AvgSim[i, j] = \frac{\sum_{Req_s \in \theta[i] \text{ AND } Req_t \in \theta[j]} SemSim[Req_s, Req_t]}{|\theta[i]| * |\theta[j]|}$$

Client device 210 may determine the maximum average similarity score between a pair of clusters (e.g., as compared to similarity scores between other pairs of clusters) on a particular iteration. If the maximum average similarity score does not satisfy (e.g., is less than) the control threshold conTH, then client device 210 may output the generated clusters as the text section clusters to be prioritized.

If the maximum average similarity score satisfies (e.g., is greater than or equal to) the control threshold conTH, then client device 210 may merge clusters, and may perform another iteration. Client device 210 may merge clusters for which the average similarity score satisfies (e.g., is greater than, is greater than or equal to, or the like) the control threshold conTH. Client device 210 may continue to iterate to merge clusters until the maximum average similarity score does not satisfy (e.g., is less than) the control threshold conTH. In this case, client device 210 may output the generated clusters as the text section clusters to be prioritized. The set of text section clusters to be prioritized may be represented as $R_G$={$G_1$, $G_2$, . . . , $G_k$}, where k≤d (e.g., where d represents that quantity of text sections in the text).

As further shown in FIG. 8, process 800 may include determining one or more prioritization techniques to be performed to prioritize the text section clusters (block 830). For example, client device 210 may determine one or more prioritization techniques to be performed to prioritize the text section clusters, as described above in connection with block 620 of FIG. 6.

As further shown in FIG. 8, process 800 may include performing a semantic centrality analysis on the text section clusters (block 840). For example, client device 210 may perform a semantic centrality analysis on the text section clusters by calculating a semantic centrality score (e.g., an average semantic similarity score) between first text sections included in a particular text section cluster and second text sections included in all other text section clusters. A semantic centrality score for a text section cluster may indicate a degree to which text sections included in the text section cluster are semantically related to other text sections included in other text section clusters. Client device 210 may calculate a semantic centrality score for multiple text section clusters, and may prioritize the text section clusters based on the semantic centrality scores (e.g., in descending order, in ascending order, etc.).

As an example, client device 210 may calculate the semantic centrality score for a particular cluster as a sum of semantic similarity scores between each text section in the particular cluster and each text section in every other cluster, divided by the sum (or, in some cases, the product) of the quantity of text sections included in the particular cluster and the quantity of text sections included in the other clusters. In other words, for a particular cluster $G_i$ included in $R_G$, client device 210 may calculate a semantic centrality score for the cluster, $SSC_{cluster}[i]$ as follows:

$$SSC_{Cluster}[i] = \frac{\sum_{Req_s \in G_i \text{ AND } Req_t \in R_G - G_i} SemSim[Req_s, Req_t]}{|G_i| * |d - G_i|}$$

While the semantic centrality score for text section clusters is described above as being calculated using a particular technique, client device 210 may use one or more other techniques to calculate the semantic centrality score. Client device 210 may use semantic centrality scores for multiple text section clusters to prioritize the text section clusters, as described in more detail in connection with block 870.

As further shown in FIG. 8, process 800 may include performing an information specificity analysis on the text section clusters (block 850). For example, client device 210 may perform an information content analysis on the text sections by calculating an information specificity score that indicates a degree to which particular text sections, included in a particular text section cluster, include specific information not included in other text sections (e.g., other text sections included in all other text section clusters). Additionally, or alternatively, an information specificity score for a cluster may indicate a relative importance of terms included in text sections included in the cluster as compared to terms included in other text sections included in other clusters. Client device 210 may calculate an information specificity score for multiple text sections clusters, and may prioritize the text section clusters based on the information specificity score (e.g., in descending order, in ascending order, etc.).

As an example, client device 210 may calculate the information specificity score for a particular cluster as an average of the information specificity scores for each text section included in the particular cluster. In other words, for a particular cluster $G_i$ included in $R_G$, client device 210 may calculate an information specificity score for the cluster, gInfo[i] as follows:

$$gInfo[i] = \frac{\sum_{Req_i \in G_i} Info[i]}{|G_i|}$$

While the information specificity score for text section clusters is described above as being calculated using a particular technique, client device 210 may use one or more other techniques to calculate the information specificity score. Client device 210 may use information specificity scores for multiple text section clusters to prioritize the text section clusters, as described in more detail in connection with block 870.

As further shown in FIG. 8, process 800 may include performing a combined analysis on the text section clusters (block 860). For example, client device 210 may perform a combined analysis on a text section cluster by calculating a semantic centrality score and an information specificity score for a cluster, as described above, and combining these scores. Client device 210 may calculate a combined score for multiple text section clusters, and may prioritize the text section clusters based on the combined score (e.g., in descending order, in ascending order, etc.).

In some implementations, client device 210 may sum the semantic centrality score and the information specificity score for a cluster to calculate a combined score for the cluster. Additionally, or alternatively, client device 210 may average the semantic centrality score and the information specificity score for a cluster to calculate a combined score for the cluster. Additionally, or alternatively, client device 210 may apply weights (e.g., different weights, user-input weights, default weights, etc.) to the semantic centrality score and/or the information specificity score for the cluster when calculating a combined score for the cluster. As an example, client device 210 may calculate the combined score for a cluster as follows:

$$CS_{cluster} = \alpha \times SCS_{cluster} + (1-\alpha) \times ISS_{cluster}$$

In the above expression, $CS_{cluster}$ may represent the combined score for a cluster, $SCS_{cluster}$ may represent the semantic centrality score for the cluster, $ISS_{cluster}$ may represent the information specificity score for the cluster, and a may represent a weight value, such as a weight value between 0 and 1 (inclusive). Alternatively, the weight values applied to the semantic similarity score and the information specificity score may not sum to 1.

Client device 210 may use the combined scores for multiple text section clusters to prioritize the text section clusters, as described in more detail in connection with block 870.

As further shown in FIG. 8, process 800 may include prioritizing the text section clusters based on performing the one or more prioritization techniques (block 870), and providing the prioritized text section clusters (block 880). For example, client device 210 may prioritize text section clusters based on semantic centrality scores, information specificity scores, combined scores, etc., associated with the text section clusters. As an example, client device 210 may prioritize the text section clusters by sorting the text section clusters using a score (e.g., in descending order of scores). In this case, client device 210 may assign a higher priority to a text section cluster associated with a higher score, and may assign a lower priority to a text section cluster associated with a lower score. In some implementations, if multiple text section clusters have the same score, client device 210 may assign a same priority to the text section clusters. Client device 210 may provide (e.g., may output for display) a list of text section clusters, and information that identifies the text sections included in the text section clusters, sorted by scores (e.g., semantic centrality scores, information specificity scores, combined scores, or the like).

In some implementations, client device 210 may output all of the prioritized text section clusters. Additionally, or alternatively, client device 210 may identify a subset of the text section clusters, and may output the subset (e.g., for display). For example, client device 210 may identify a subset of text section clusters with a score that satisfies a threshold (e.g., a default threshold, a user-specified threshold, etc.). Additionally, or alternatively, client device 210 may identify a quantity or a percentage of text section clusters with the highest scores (e.g., a default quantity or percentage, such as 5%, a user-specified quantity or percentage, etc.).

Additionally, or alternatively, client device 210 may classify text section clusters into priority groups based on the scores. For example, client device 210 may assign the first quarter of text section clusters with the highest scores to a high priority group, may assign the second quarter of text section clusters with the next-highest scores to an above average priority group, may assign the third quarter of text section clusters with the next-highest scores to a below average priority group, and may assign the fourth quarter of text section clusters with the lowest scores to a low priority group. Client device 210 may output information that indicates a priority group to which a text section cluster belongs, may exclude text section clusters in a particular priority group (e.g., a low priority group) from being provided for display, or the like.

Additionally, or alternatively, client device 210 may prioritize text sections within a text section cluster, such as by comparing scores of the text sections, as described above in connection with block 660. Additionally, or alternatively, client device 210 may output information that identifies the prioritized text sections within a text section cluster, as described above in connection with block 670. For example, if client device 210 sorts text section clusters using semantic centrality scores for the clusters, then client device 210 may also sort text sections within a cluster based on the semantic centrality scores for the text sections. Similarly, client device 210 may sort text sections based on information specificity scores when client device 210 sorts text section clusters based on information specificity scores, and may sort text sections based on combined scores when client device 210 sorts text section clusters based on combined scores.

In this way, client device 210 may increase the speed and accuracy with which groups of information, included in text, is prioritized. This may assist a user in determining important information and/or information groups included in the text.

Figure 9:
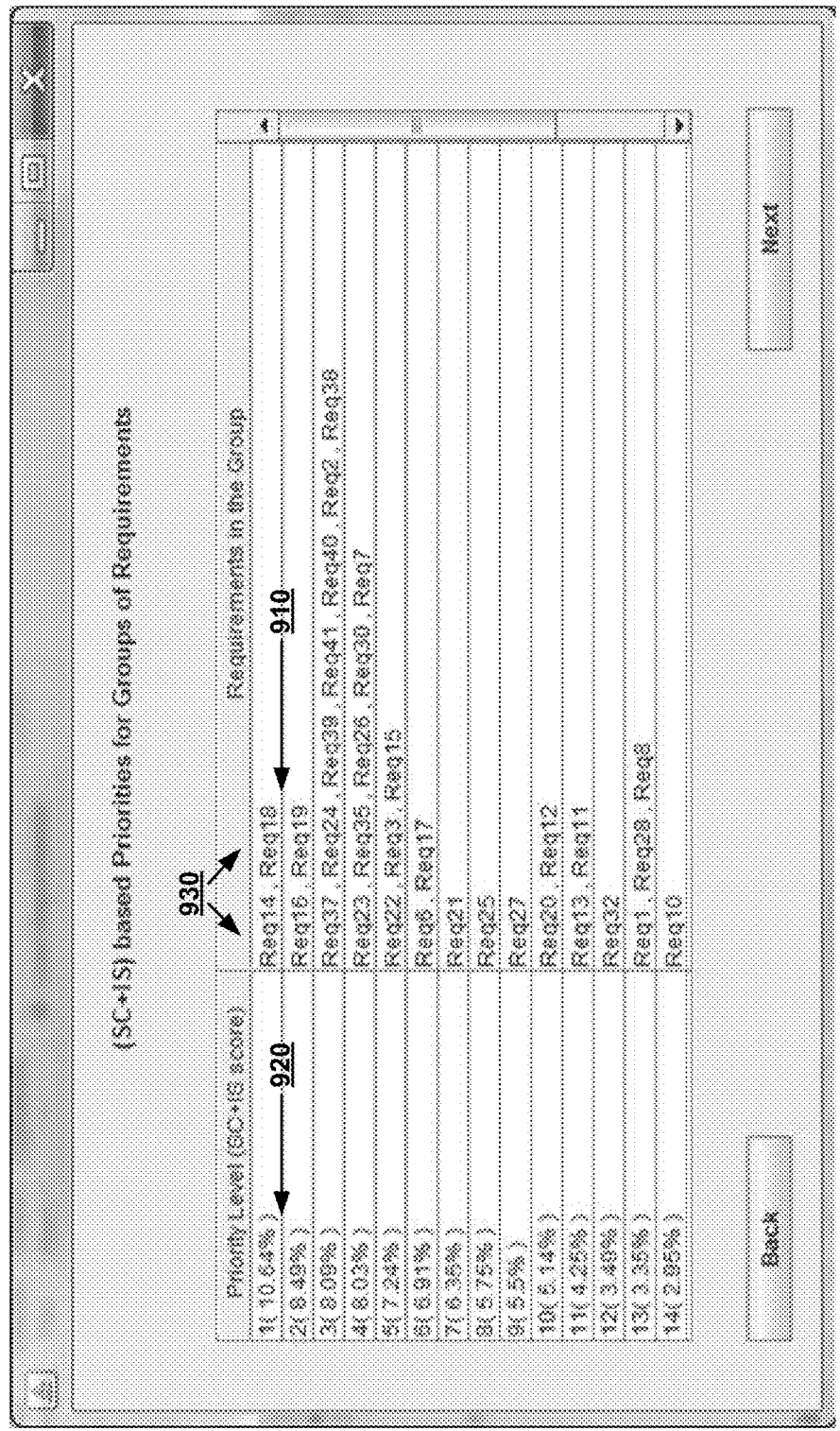
FIG. 9 is a diagram of an example implementation relating to the example process shown in FIG. 8.

FIG. 9 is a diagram of an example implementation 900 relating to example process 800 shown in FIG. 8. FIG. 9 shows example output based on processing text to prioritize requirement clusters included in the text.

As shown in FIG. 9, assume that client device 210 has generated requirement clusters, that include one or more requirements, based on the requirements document shown in FIG. 5B. Further, assume that client device 210 has calculated combined scores, for the requirement clusters, based on calculating semantic centrality (SC) scores and information specificity (IS) scores for the requirement clusters. As shown by reference number 910, assume that a first cluster includes [Req14] and [Req18], that a second cluster includes [Req16] and [Req19], etc. As shown by reference number 920, the first cluster is associated with the highest combined score (e.g., 10.64), the second cluster is associated with the next-highest score (e.g., 8.49), etc. Based on these scores, client device 210 provides the clusters, in descending order of scores, on a user interface.

Further, assume that [Req14] has a higher combined score than [Req18]. Based on this, and as shown by reference number 930, assume that client device 210 provides [Req14] before [Req18] (e.g., from left to right) on the user interface. In some implementations, the user may interact with a requirement label (e.g., [Req14]) to cause client device 210 to display the text associated with that requirement label. In this way, a user may easily determine the most important information included in text, based on semantic relatedness, information content, or another measure of importance.

As indicated above, FIG. 9 is provided merely as an example. Other examples are possible and may differ from what was described with regard to FIG. 9.

Implementations described herein may utilize natural language processing to prioritize information (e.g., requirements) included in text, thereby increasing the speed and accuracy of information prioritization.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
one or more processors to:
receive text to be processed to prioritize a plurality of text sections included in the text;
perform a first set of prioritization techniques to prioritize the plurality of text sections,
the first set of prioritization techniques including:
a semantic centrality analysis that includes:
a calculation of a first average semantic similarity score for a first text section, of the plurality of text sections, based on a first degree to which the first text section is semantically related to one or more second text sections of the plurality of text sections, and
a calculation of a second average semantic similarity score for the one or more second text sections based on a second degree to which each of the one or more second text sections are semantically related to one or more third text sections of the plurality of text sections, and an information content analysis that includes:
a calculation of a first information specificity score, for the first text section, based on a third degree to which the first text section includes specific terms not included in the one or more second text sections, and
a calculation of a second information specificity score, for the one or more second text sections, based on a fourth degree to which the one or more second text sections include specific terms that are not included in the one or more third text sections;
prioritize the plurality of text sections, to form a set of prioritized text sections, based on performing the first set of prioritization techniques;
determine, based on prioritizing the plurality of text sections, whether a semantic similarity score satisfies a threshold score,
the semantic similarity score being a measure of semantic relatedness between at least two particular text sections of the set of prioritized text sections;
generate a text section cluster based on the semantic similarity score satisfying the threshold score,
the text section cluster comprising the at least two particular text sections; and
prioritize a set of text section clusters based on performing a second set of prioritization techniques,
the set of text section clusters including the text section cluster.

2. The device of claim 1, where the one or more processors are further to:
calculate a first combined score, for the first text section, based on the first average semantic similarity score and the first information specificity score; and
calculate a second combined score, for the one or more second text sections, based on the second average semantic similarity score and the second information specificity score; and
where the one or more processors, when prioritizing the plurality of text sections, are to:
prioritize the plurality of text sections based on the first combined score and the second combined score.

3. The device of claim 1,
where the one or more processors, when prioritizing the plurality of text sections, are to:
compare the first average semantic similarity score and the second average semantic similarity score; and
assign relative priorities to the first text section and the one or more second text sections based on comparing the first average semantic similarity score and the second average semantic similarity score.

4. The device of claim 1,
where the semantic centrality analysis is a first semantic centrality analysis;
where the information content analysis is a first information content analysis;
where the one or more processors are further to:
perform at least one of:
second semantic centrality analysis that indicates a degree to which the text section cluster is semantically related to at least one other text section cluster, or
second information content analysis that indicates a degree to which the text section cluster includes information not included in at least one other text section cluster; and
where the one or more processors, when prioritizing the set of text section clusters are to:
prioritize the set of text section clusters based on performing at least one of the second semantic centrality analysis or the second information content analysis to form a set of prioritized text section clusters.

5. A computer-readable medium storing instructions, the instructions comprising:
one or more instructions that, when executed by one or more processors, cause the one or more processors to:
receive text to be processed to prioritize information included in the text;
perform a first set of prioritization techniques to prioritize the information included in the text,
the first set of prioritization techniques including:
a semantic centrality analysis that includes:
a calculation of a first average semantic similarity score for a first text section, of a plurality of text sections, based on a first degree to which the first text section is semantically related to one or more second text sections of the plurality of text sections, and
a calculation of a second average semantic similarity score for the one or more second text sections based on a second degree to which each of the one or more second text sections are semantically related to one or more third text sections of the plurality of text sections, and
an information content analysis that includes:
a calculation of a first information specificity score, for the first text section, based on a third degree to which the first text section includes specific terms not included in the one or more second text sections, and
a calculation of a second information specificity score, for the one or more second text sections, based on a fourth degree to which the one or more second text sections include specific terms that are not included in the one or more third text sections;
prioritize the text section, the one or more second text sections, and the one or more third text sections, to form a set of prioritized text sections, based on performing the first set of prioritization techniques;
determine, based on prioritizing the text section, the one or more second text sections, and the one or more third text sections, whether a semantic similarity score satisfies a threshold score,
the semantic similarity score being a measure of semantic relatedness between at least two particular text sections of the set of prioritized text sections;
generate a text section cluster based on the semantic similarity score satisfying the threshold score,
the text section cluster comprising the at least two particular text sections;
and
prioritize a set of text section clusters based on performing a second set of prioritization techniques,
the set of text section clusters including the text section cluster.

6. The computer-readable medium of claim 5, where the one or more instructions, that cause the one or more processors to perform the information content analysis, cause the one or more processors to:
- calculate a sum of term frequency-inverse document frequency (tf-idf) scores for each term included in the first text section; and
- where the one or more instructions, that cause the one or more processors to prioritize the first text section, the one or more second text sections, and the one or more third text sections, cause the one or more processors to:
  - prioritize the first text section, the one or more second text sections, and the one or more third text sections based on the sum of tf-idf scores.

7. The computer-readable medium of claim 5,
where the one or more instructions, that cause the one or more processors to prioritize the first text section, the one or more second text sections, and the one or more third text sections, cause the one or more processors to:
- assign a relative priority to the first text section and at least one other text section included in the text section cluster; and where the one or more instructions, when executed by the one or more processors, further cause the one or more processors to:
- provide information that indicates the relative priority assigned to the first text section and the at least one other text section.

8. The computer-readable medium of claim 5, where the text includes a requirements document; and
where the first text section, the one or more second text sections, and the one or more third text sections correspond to requirements included in the requirements document.

9. A method, comprising:
- receiving, by a device, text to be processed to prioritize information included in the text;
- performing, by the device, a first set of prioritization techniques to prioritize the information included in the text,
  - the first set of prioritization techniques including:
    - a semantic centrality analysis that includes:
      - calculating a first average semantic similarity score for a first text section, of a plurality of text sections, based on a first degree to which the first text section is semantically related to one or more second text sections of the plurality of text sections, and
      - calculating a second average semantic similarity score for the one or more second text sections based on a second degree to which each of the one or more second text sections are semantically related to one or more third text sections of the plurality of text sections, and
    - an information content analysis that includes:
      - calculating a first information specificity score, for the first text section, based on a third degree to which the first text section includes specific terms not included in the one or more second text sections, and
      - calculating a second information specificity score, for the one or more second text sections, based on a fourth degree to which the one or more second text sections include specific terms that are not included in the one or more third text sections;
- assigning, by the device, relative priorities to the first text section, the one or more second text sections, and the one or more third text sections based on performing the first set of prioritization techniques;
- determining, by the device and based on assigning the relative priorities to the first text section, the one or more second text sections, and the one or more third text sections, whether a semantic similarity score satisfies a threshold score,
  - the semantic similarity score being a measure of semantic relatedness between at least two particular text sections of the plurality of text sections;
- generating, by the device, a text section cluster based on the semantic similarity score satisfying the threshold score,
  - the text section cluster comprising the at least two particular text sections; and
- prioritizing, by the device, a set of one or more text section clusters based on performing a second set of prioritization techniques,
  - the set of one or more text section clusters including the text section cluster.

10. The method of claim 9, further comprising:
receiving a configuration parameter input by a user; and
where performing the first set of prioritization techniques comprises:
- performing the first set of prioritization techniques based on the configuration parameter.

11. The method of claim 9,
where performing the information content analysis comprises:
- calculating a plurality of respective sums of term frequency-inverse document frequency (tf-idf) scores corresponding to each of the plurality of text sections; and
- calculating an average tf-idf score for the first text section, the one or more second text sections, and the one or more third text sections; and where assigning the relative priorities to the first text section, the one or more second text sections, and the one or more third text sections comprises:
- assigning the relative priorities based on the average tf-idf score for the first text section, the one or more second text sections, and the one or more third text sections.

12. The method of claim 9,
where the semantic centrality analysis is a first semantic centrality analysis;
where the information content analysis is a first information content analysis;
where the method further comprises:
- performing at least one of:
  - second centrality analysis on the one or more text section clusters; or
  - second information content analysis on the one or more text section clusters; and where prioritizing the set of one or more text section clusters comprises:
- prioritizing the set of one or more text section clusters based on performing the at least one of the second centrality analysis or the second information content analysis.

13. The device of claim 1, where the one or more processors are further to:
- receive a tag list that identifies one or more tags associated with identifying one or more terms; and associate the one or more tags with one or more particular terms in the plurality of text sections based on one or more tag association rules, the one or more tag association rules identifying a manner in which the one or more tags are to be associated with the plurality of the text sections, and associating of the tags with the plurality of text sections being based on one or more characteristics of the one or more particular terms; and where the one or more processors, when prioritizing the plurality of text sections, are to:

prioritize the plurality of text sections based on associating the one or more tags with the one or more particular terms.

14. The device of claim 1, where the one or more processors are further to:

receive a term list that identifies one or more terms in the text; and generate a data structure that indicates a frequency count of the one or more terms in the text; and where the one or more processors, when prioritizing the plurality of text sections, are to:

prioritize the plurality of text sections based on generating the data structure.

15. The device of claim 1, where the one or more processors are further to:

determine a manner in which the text is to be partitioned into the plurality of text sections; and partition the text into the plurality of text sections based on determining the manner.

16. The computer-readable medium of claim 5, where the one or more instructions, when executed by the one or more processors, further cause the one or more processors to:

determine a manner in which the text is to be partitioned into the plurality of text sections; and partition the text into the plurality of text sections based on determining the manner, where a text section, of the plurality of text sections, includes at least one of:

a sentence, a line, a paragraph, a page, or a document.

17. The computer-readable medium of claim 5, where the one or more instructions, when executed by the one or more processors, further cause the one or more processors to:

receive a term list that identifies one or more terms in the text; and receive a tag list that identifies one or more first tags associated with identifying the one or more terms, the tag list including one or more stop tags, the one or more stop tags identifying one or more second tags associated with terms that are not to be included in the term list; and where the one or more instructions, that cause the one or more processors to prioritize the plurality of text sections, cause the one or more processors to:

prioritize the plurality of text sections based on receiving the term list and the tag list.

18. The computer-readable medium of claim 5, where the one or more instructions, when executed by the one or more processors, further cause the one or more processors to:

receive a term list that identifies one or more terms in the text, the term list including one or more stop terms, the one or more stop terms identifying terms that are not to be included in the term list; and receive a tag list that identifies one or more tags associated with identifying the one or more terms, where the one or more instructions, that cause the one or more processors to prioritize the plurality of text sections, cause the one or more processors to:

prioritize the plurality of text sections based on receiving the term list and the tag list.

19. The method of claim 9, further comprising:

calculating a combined score associated with the semantic centrality analysis and the information content analysis based on at least one of:

summing the first average semantic similarity score, the second average semantic similarity score, the first information specificity score, and the second information specificity score, or applying weights to the first average semantic similarity score, the second average semantic similarity score, the first information specificity score, and the second information specificity score; and where assigning the relative priorities to the first text section, the one or more second text sections, and the one or more third text sections comprises:

assigning the relative priorities based on calculating the combined score.

20. The method of claim 9, further comprising:

determining an average similarity score between the text section cluster and another text section cluster; and merging the text section cluster and another text section cluster based on the average similarity score satisfying a threshold.

* * * * *